May 30, 1950 B. HAYTER ET AL 2,509,819
FUEL SUPPLY CONTROL VALVE
Filed May 10, 1946 2 Sheets-Sheet 1

Inventors
Bruce Hayter
Milton D. Huston
by Parker & Carter
Attorneys.

May 30, 1950  B. HAYTER ET AL  2,509,819
FUEL SUPPLY CONTROL VALVE
Filed May 10, 1946  2 Sheets-Sheet 2
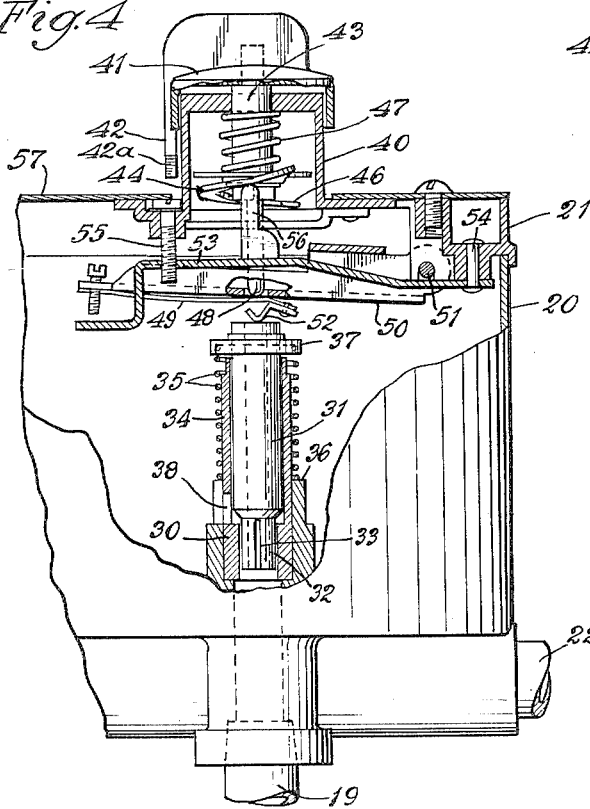
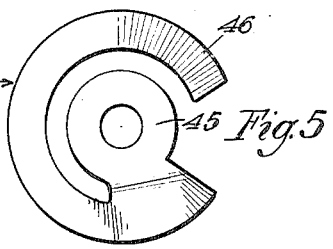
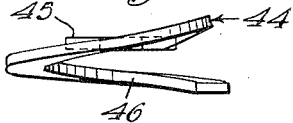
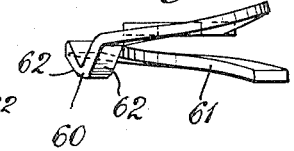
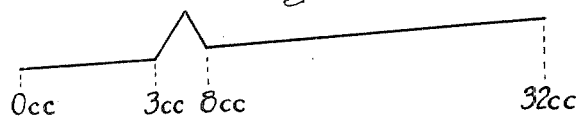
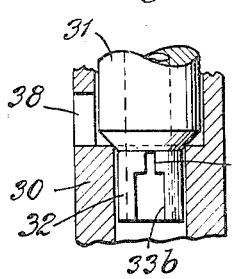
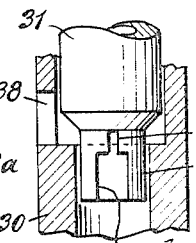
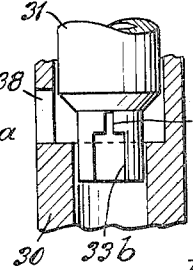
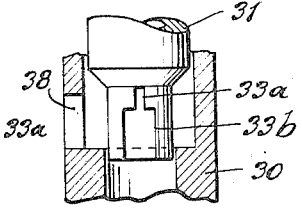
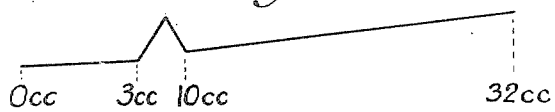
Inventor
Bruce Hayter
Milton D. Huston
by Parker Carter
Attorneys Patented May 30, 1950

2,509,819

UNITED STATES PATENT OFFICE 2,509,819

FUEL SUPPLY CONTROL VALVE

Bruce Hayter and Milton D. Huston, Sante Fe, N. Mex., assignors, by mesne assignments, to Breese Burners, Inc., Santa Fe, N. Mex., a corporation of Delaware Application May 10, 1946, Serial No. 668,696

3 Claims. (Cl. 251—132)

The invention relates to an improvement in fuel supply control means for liquid fuel burners.

One purpose is to provide means for supplying fuel to hydroxylating pot type burners.

Another purpose is to provide fuel supply means which increase the rate of fuel flow rapidly, from the pilot stage to the intermediate stage.

Another purpose is to provide liquid fuel control means effective to prevent smoking.

Another purpose is to provide a liquid fuel control means for causing a sharply increased rate of liquid fuel flow between the pilot stage and the low or intermediate stage.

Other purposes will appear from time to time in the course of the specification and claims.

The invention is illustrated more or less diagrammatically in the accompanying drawings wherein:

Figure 4 is an elevation of a float valve assembly, with parts in vertical section;

Figure 5 is a plan view of a float valve control cam;

Figure 6 is a side view of the structure of Figure 5;

Figure 7 is a side view of a modified form of control cam;

Figure 8 is a diagrammatic illustration of the operation of the control mechanism of Figures 1 and following;

Figures 9, 10, 11 and 12 illustrate, partly in section and partly in elevation, a specially slotted valve stem shown at various positions of control; and Figure 13 is a diagrammatic cam development.

Like parts are indicated by like symbols throughout the specification and drawings.

Figure 1:
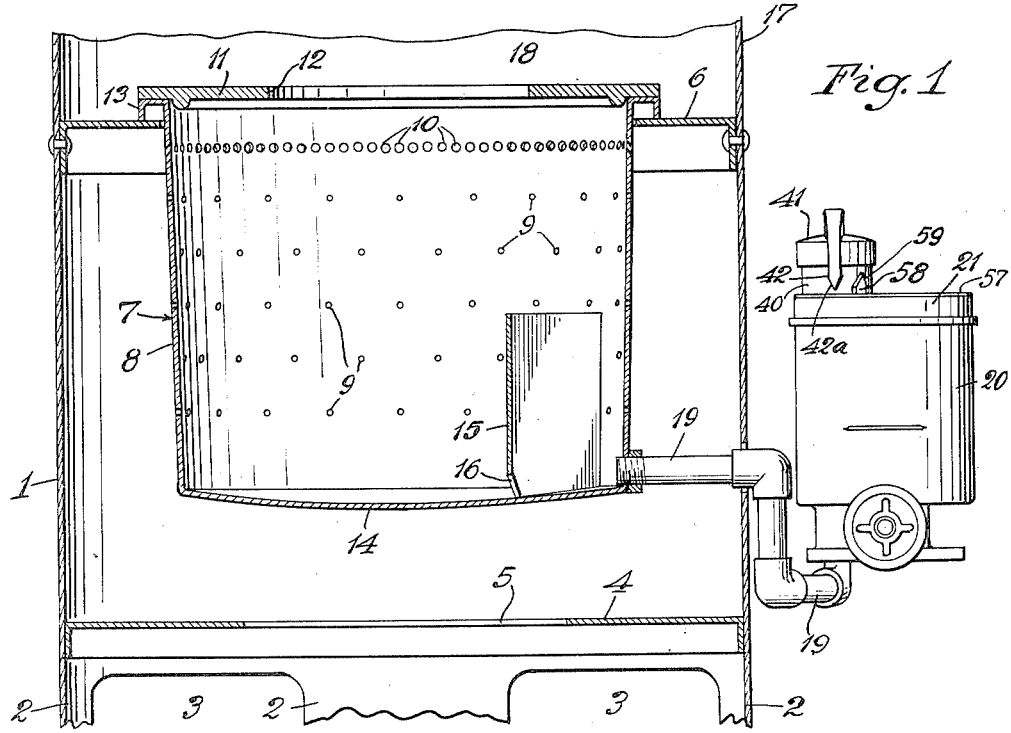
Figure 1 is a vertical section taken through a burner, with a float valve control illustrated in elevation.

Referring to the drawings 1 generally indicates any suitable heater structure, in the form of an outer cylinder having supporting member 2 separated by open spaces 3. 4 is a partial closure for the bottom of the space surrounded by the drum or housing member 1. It is provided with an air inlet aperture 5. 6 is a supporting ring shown as angular in cross section. Supported upon it is the hydroxylating burner pot generally indicated as 7. It includes a side wall 8 having a plurality of primary air inlets 9, spaced circumferentially thereabout and located at various distances from the top of the pot. 10 indicates a row of secondary air inlet apertures, more closely spaced, and larger in gauge, than the primary air inlet apertures. 11 is a flame ring centrally apertured as at 12, which partially closes the top of the pot. The pot may actually be supported upon the angle ring 6 by any suitable flange 13. 14 indicates the bottom of the pot, which is shown as slightly concave. 15 indicates any suitable pilot piece or pilot housing which surrounds the area of admission of liquid fuel. It may be apertured as at 16, for communication with the pot interior. The wall 1 is upwardly continued as at 17 to surround a combustion space 18, which may be provided with suitable flue means not herein shown. 19 is a liquid fuel supply duct adapted to deliver liquid fuel to the space within the pilot piece 15. It will be understood that at the pilot stage all or most of the fuel is vaporized within the pilot space and burns either in or at the top of the pilot space, or at the aperture 16. 20 generally indicates any suitable float valve housing, having the removable top 21. Liquid fuel flows therefrom along the duct 19. Liquid fuel may be delivered to the float chamber or housing 20, along the supply duct 22, from any suitable source not herein shown. Since they do not of themselves form part of the present invention, the float details are not herein indicated.

Figure 3:
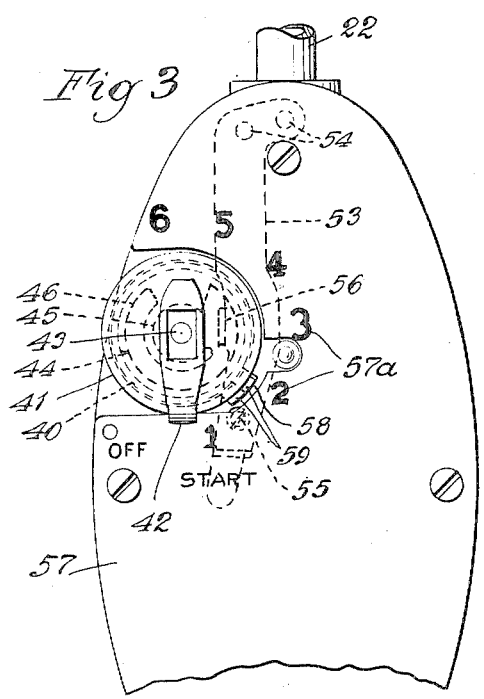
Figure 3 is a plan view of the structure of Figure 2.
Figure 2:
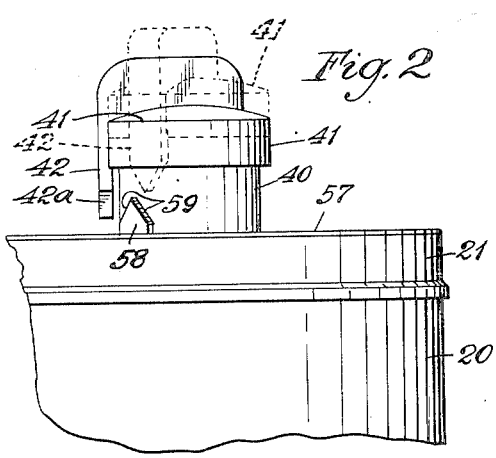
Figure 2 is a partial end elevation on an enlarged scale, of the float valve unit.

Liquid fuel from the float valve chamber flows through and across the valve seat structure generally indicated at 30. The valve stem 31 has a reduced bottom head 32 provided with any suitable metering slot 33. It moves in a guide 34 and is normally upwardly thrust to the limit of its permitted movement, by the coil spring 35 compressed between the bottom seat 36 and the valve stem cap 37. An oil flow aperture 38 is provided to permit the oil from the float chamber to reach the valve and valve seat. 40 is a knob control guide, suitably mounted on the float chamber housing 20 for example on the removable top 21. Rotatable thereabout is the manual control knob 41, having the downwardly extending side finger and pointer 42. The knob has fixed to it a stem 43 which extends through a suitable aperture in the guide 40 and carries the cam structure 44 which includes a central hub 45 and the actuating helical cam 46. The coil spring 47 is effective to hold the knob and cam in the desired downward position. 48 is a shaft downwardly extending from and concentric with the stem 43. The shaft bears against a spring 49 fixed on the control arm 50 which is pivoted as at 51 on the cover 21. The spring 49 carries a valve engaging abutment 52, which engages the top of the movable valve element 31. 53 is a normally fixed but adjustable element secured as at 54 to the top 21 and adjustable by the screw 55. Upwardly projecting from it is the cam engaging member 56. The purpose of this cam engaging member 56 is to initially adjust the position of the valve by manipulating the screw 55, the cam member 56 may be raised up and down carrying with it the cam member 44 and compressing more or less the spring 47. It will be understood that the cap or control knob 41 is free to move upwardly when the spring 47 is compressed. As the knob 41 is rotated counterclockwise, the result of the consequent rotation of the spiral 46 is to permit the valve 31 to be raised by the spring 35. Rotation in the opposite direction causes a resultant downward movement of the valve 31. 57 indicates any suitable top plate provided with suitable calibration as at 57a. As shown in Fig. 3 this calibration includes an "off" position and a series of numbers indicated in that figure as from 1 to 6. It will be realized that any suitable calibration may be employed. Positioned between numbers 1 and 2 is an abutment or upwardly projecting impeding element 58. It is shown as having steeply inclined converging edge portions 59. The member 58 is so positioned that it engages the finger 42, when the knob is rotated forwardly from the number one position. The finger 42 also has steeply inclined converging sides 42a. The sides 42a and 59 are so steep that the finger 42 cannot rest on the member 58. It must either be positioned on one side of it or on the other. In effect, the knob therefore cannot be set in a valve control position corresponding to the total width of the member 58. This valve position is therefore eliminated in normal possible setting of the valve 31. Since the cam 46 is fairly steeply inclined, this is equivalent to cutting out a range of flow otherwise represented by the space or distance occupied by the member 53. Thus with reference to Fig. 8, if the knob 41 is rotated from the zero position to the 3 cc. position, the member 58 has no effect. But when the member 58 is contacted by the member 42 no valve setting is possible until the finger 42 has been lifted over the member 58. Because of the steepness of the opposed edges 42a and 59, the next possible setting is at the 8 cc. setting of Figure 8. From then on the setting can be changed at will up to the indicated maximum of 32 cc. The actual flow in cubic centimeters per minute however can be varied to suit the particular problem. Thus there is provided means for cutting out a range of setting, from the maximum pilot setting, to the advantageous minimum combustion setting.

It will be understood that the cam 46 may be provided with a steepened area which may perform the same function. However, it may be somewhat more advantageous to have an exterior and observable member such as 58.

As another practical means for cutting part of the range of flow, there is illustrated in Fig. 7 a downward offset 60 in the otherwise regular helix 61 of a variant form of cam. The downward offset 60 has relatively steep converging side walls 62, which are so steep that they will not rest on the top of the member 56, but will slide to one side or to the other. The effect on the rate of flow of the form of Fig. 7 is also properly indicated in the diagram of Fig. 8. The range between 3 cc. to 8 cc. is simply cut out.

The same result may be obtained by a special form of valve metering aperture. Figs. 9 to 12 should be considered in connection with Fig. 4. In Fig. 4 the metering aperture 33 is shown as of uniform width from top to bottom. In the form of Figs. 9 to 12 the valve slot has an upper reduced portion 33a and a lower laterally enlarged portion 33b. As the knob is rotated, and is forced by the member 58 to make a substantial extra jump, the valve stem is rather sharply raised to increase the flow. It will be understood, of course, that any means for forcing this jump in the position of the knob can be used. If the formation of the metering slot of Figs. 9 to 12 is used with the finger 42 and the interrupter 58, the result is indicated in the various positions of the valve. Figure 9 illustrates the zero position, when the pointer is at the off position. When the pointer is moved toward numeral 2 and somewhat beyond the numeral 1 position the cam is effective to raise the consumption from zero cc. to 3 cc., with reference to Fig. 13. The cam effect of the member 58 forces a rotation of the knob 41 to a position in which the finger 42 is beyond the member 58. The resultant lifting of the valve makes an abrupt change in the effective diameter of the metering slot. Whereas up to 3 cc. at one side of the interrupter 58 only the narrow portion 33a is effective, the lifting of the knob to position the finger 42 beyond the interrupter 58 depresses the knob to position beyond the interrupter 58 raising the valve stem to the position of Fig. 11 in which the wide part 33b of the metering slot begins to pass fuel. Thereafter, continued rotation of the knob lifts the valve stem until the top position of Fig. 12 is reached, which may correspond to the 32 cc. flow of the diagram of Fig. 13.

It will be realized that, whereas, we have described and illustrated a practical and operative device, nevertheless many changes may be made in the size, shape, number and disposition of parts without departing from the spirit of our invention. We therefore wish our description and drawings to be taken as in a broad sense illustrative or diagrammatic, rather than as limiting us to our precise showing.

The use and operation of the invention are as follows:

In hydroxylating pot type burners, when a burner pot 7 is employed with a pilot housing or restrictor such as 15, of which various types have been used by applicant, and with the liquid fuel supply delivered to restricted pilot zone, a relatively small volume of fuel is delivered at a rate of from 1 cc. to 3 cc. per minute. In the particular pilot device herein shown, a clean blue fire is maintained in the "chimney" member 15, with a little flame at the top, when the minimum flow 1 cc. is maintained. As the flow is increased, say to 3 cc. per minute, to give a rough illustration, there is a substantial flame at the top of the pilot 15, but the pilot is still able to take the entire volume of liquid fuel, as delivered, and vaporize and burn it, without leakage of unvaporized liquid fuel to the rest of the burner, and without smoking or deposit of free carbon.

The threshold may vary in different burners, or in different sizes of burner, but when the rate of delivery increases above some critical level, which may be of the order of 3 cc. per minute, then the pilot or restrictor does not vaporize and burn all of the fuel, and liquid fuel flows into the outside or major portion of the interior of the pot. Assume that the rate of delivery is just above the rate which the pilot will vaporize and burn. Assume, for example, that the top limit of the pilot is 3 cc. and that the rate has risen to 4 cc. per minute, the surplus oil spills out into the main interior of the pot 7 and vaporizes and burns with a smudgy flame. There is a small flame in the big pot space, and the general air supply of the pot does not have a relation to the flame, or to the vaporized fuel, proper to maintain hydroxylating or two stage combustion. In other words, the characteristic initial formation of a primary mixture, and the completion of the mixture by secondary air, followed by full combustion, does not take place. Instead there is thermal decomposition, and a smoky flame, coupled with deposit of carbon, and sooting up of the pot.

As the rate of flow increases, and more liquid fuel is being vaporized in the pot, conditions get worse, and the smudge and soot deposit increases. However, at some threshold point, which may differ in different pots and sizes, the pot begins to fill with fire, and hydroxylation begins. To take a specific example, a particular pot may have a very satisfactory pilot flame at 3 cc. and a very satisfactory combustion condition in the rest of the pot at 8 cc. or 9 cc., but an exceedingly unfavorable and smudgy condition in the range between 3 cc. and 8 or 9 cc. Once a satisfactory condition of combustion is reached, combustion may be increased, up to the maximum combustion rate of the pot.

The problem is to prevent the pot from operating in the intermediate smoky range. One solution is to cause a "snap increase" of the rate of flow, which cuts out the undesirable range. Although all of the liquid fuel is delivered to and through the pilot piece or zone 15, there are several ways in which this result can be obtained. In using a rotary valve control member, with a cam the cam may be provided with a step portion so that, where it would otherwise be set within the undesirable range, it cannot readily be so set, and will drop back to a pilot setting unless the control is positively turned to pass upwardly beyond the step cam portion. However, we prefer to have the outside rotary control handle or knob 41 operate across a plate 21 having a sharp upward projection 53, to block out the undesired range, over which the finger 42 has to be lifted, so that the knob 41 cannot conveniently be set at a position which will cause the undesired rate or range of flow. A less effective solution is simply to put a warning color or indication on the control calibration, so that the user is advised not to set the control within the undesired range. It is also possible to vary or control the slot outlet through which the oil flows, as in the form of Figures 9 to 12.

It will be understood that whereas a particular pilot piece, in the form of a chimney 15 is shown, the above method and mechanism is applicable for use with a wide variety of pilot members, which can either be positioned within the pot or can be outside of the pot and in communication with the interior of the pot. The details or forms of these various pilot arrangements do not of themselves form part of the present invention. However, in applying the invention it is broadly necessary to have a segregated pilot area in which the air conditions for air supply are properly arranged to burn a small volume of flow of liquid fuel, which may, for illustration, be of the order of 1 cc. to 3 cc. per minute. This pilot zone is in communication with the main combustion zone, in which a larger volume of fuel can properly be burned. However, whether an inside pilot piece is employed, or an outside pilot chamber, and whether or not the pilot piece employed the same as shown herein, it is highly advantageous to insure that at no time, for any substantial duration, will the liquid fuel be delivered to the main combustion space at a rate of flow sufficiently low to cause a smudgy flame. The present invention provides simple and efficient means for preventing a disadvantageously low rate of flow of liquid fuel to the main combustion zone or member, while permitting a suitably low pilot rate of flow.

A differentiation may be made between what may be called pilot flow, in which enough fuel is delivered to maintain only pilot combustion, and full combustion flow, in which sufficient fuel is supplied, for vaporization, to maintain combustion in the pot at substantially above the pilot rate. Preferably but not necessarily the pilot combustion is limited to a specific and defined part of the pot space, which may be localized about the area of fuel delivery to the pot. Full combustion, in contrast, results from a rate of flow adequate to support combustion, if not throughout the entire interior of the pot, at least across the entire diameter of the pot, and at substantially above the pilot rate. Under full combustion conditions the rate of fuel delivery may vary throughout a substantial range, but is kept above a minimum rate below which smoking and carbon deposit takes place.

We claim:

1. In a liquid flow control for burners and the like, a metering valve, yielding means tending to move it from closed to open position, a manual control means including a knob, a cam mounted on the knob for movement therewith, a fixed abutment, yielding means for holding the cam thereagainst while causing it and the knob to rise and fall responsive to movement along the abutment, connecting means between the knob and the valve whereby as the knob rotates, the valve is caused to move up and down in consonance with said rotation, the cam including an abutment engaging surface, the inclination of which is generally uniform throughout its entire length except for an interruption in the cam surface defined by two sharply inclined surfaces, inclination of such surfaces being such that as the knob is released by the operator, while the abutment engages either of such surfaces, the abutment by engagement with such surfaces causes cam movement until abutment engages the cam on one side or the other of such inclined surfaces.

2. A metering flow control means for burners and the like, including a valve for longitudinal movement between closed position and maximum flow position, through intermediate working positions, yielding means adapted to move the valve in one direction, a manually rotatable member, a cam rigidly mounted thereon, a fixed cam abutment engaged by the cam whereby angular movement of the manually rotatable member displaces the cam and member in a direction parallel with the axis of rotation thereof, a driving connection between the manually rotatable member and the valve whereby rotation of the former in one direction overcomes the yielding means and moves the valve in one direction, and when moved in the opposite direction, relieves the pressure on the yielding means to permit the valve to move in the opposite direction, the cam having intermediate its ends a hump, inclined sides of the hump being of such steepness that stable positioning of the valve with the abutment engaging the wall of the hump alone is impossible.

3. A metering flow control means for burners and the like, including a valve for longitudinal movement between closed position and maximum flow position, through intermediate working positions, yielding means adapted to move the valve in one direction, a manually rotatable member, a cam rigidly mounted thereon, a fixed cam abutment engaged by the cam whereby angular movement of the manually rotatable member displaces the cam and member in a direction parallel with the axis of rotation thereof, a driving connection between the manually rotatable member and the valve whereby rotation of the former in one direction overcomes the yielding means and moves the valve in one direction, and when moved in the opposite direction, relieves the pressure on the yielding means to permit the valve to move in the opposite direction, the cam surface being of generally constant inclination except for a short space intermediate its ends, such short space being occupied by a projecting member extending into the path of the abutment, the surfaces of which are too steep to support the abutment in stable position.

BRUCE HAYTER.
MILTON D. HUSTON.

REFERENCES CITED

The following references are of record in the file of this patent:

UNITED STATES PATENTS

| Number | Name | Date |
| --- | --- | --- |
| 1,553,447 | Jackson | Sept. 15, 1925 |
| 2,008,151 | Nest et al. | July 16, 1935 |
| 2,155,761 | Johnson | Apr. 25, 1939 |
| 2,207,123 | Johnson | July 9, 1940 |
| 2,301,041 | Hann | Nov. 3, 1942 |
| 2,356,928 | Hahn | Aug. 29, 1944 |